(12) United States Patent
Nagayama et al.

(10) Patent No.: US 6,399,173 B1
(45) Date of Patent: Jun. 4, 2002

(54) OPTICAL RECORDING MEDIUM AND METHOD FOR MAKING THE SAME

(75) Inventors: Mori Nagayama; Jiro Yoshinari, both of Tokyo (JP)

(73) Assignee: TDK Corporation, Tokyo (JP)

(*) Notice: Subject to any disclaimer, the term of this patent is extended or adjusted under 35 U.S.C. 154(b) by 0 days.

(21) Appl. No.: 09/503,171

(22) Filed: Feb. 14, 2000

(30) Foreign Application Priority Data

Feb. 18, 1999 (JP) .......................................... 11-040270

(51) Int. Cl.[7] .................................................. B32B 3/02
(52) U.S. Cl. ..................... 428/64.1; 428/64.5; 428/64.6; 430/270.13
(58) Field of Search ................................ 428/64.1, 64.4, 428/64.5, 64.6, 913; 430/270.13, 495.1, 945; 369/283, 288

(56) References Cited

U.S. PATENT DOCUMENTS

| | | | |
|---|---|---|---|
| 4,889,746 A | | 12/1989 | Utsumi et al. |
| 5,627,012 A | * | 5/1997 | Tomingag ............... 430/270.13 |
| 6,153,355 A | * | 11/2000 | Takahashi ............... 430/270.13 |
| 6,242,157 B1 | * | 6/2001 | Tominaga ............... 430/270.13 |

FOREIGN PATENT DOCUMENTS

| | | |
|---|---|---|
| JP | 5-62259 | 3/1993 |
| JP | 8-106647 | 4/1996 |
| JP | 8-221814 | 8/1996 |
| JP | 10-79144 | 3/1998 |
| JP | 10-226173 | 8/1998 |

* cited by examiner

*Primary Examiner*—Elizabeth Evans
(74) *Attorney, Agent, or Firm*—Oblon, Spivak, McClelland, Maier & Neustadt, P.C.

(57) ABSTRACT

In phase change optical recording media wherein initialization process of the recording layer has been the rate determining and cost-increasing factor in the production of the medium, the production cost is reduced by reducing the time required for the initialization and simplification of the initialization process. Stable writing/reading properties are also realized from immediately after the initialization. The present invention provides an optical recording medium comprising a substrate and a recording layer formed over the substrate, wherein the recording layer comprises two or more unit recording layers wherein adjacent two unit recording layers are constituted from different materials and mixture layers between the two adjacent unit recording layers containing all of the elements included in the adjacent two unit recording layers; at least one of the two adjacent unit recording layers is a crystalline layer; and the overall composition of the recording layer falls within the composition of a phase change recording material.

13 Claims, 1 Drawing Sheet

OPTICAL RECORDING MEDIUM AND METHOD FOR MAKING THE SAME

BACKGROUND OF THE INVENTION

1. Field of the Invention

This invention relates to a phase change optical recording medium and method for making such an optical recording medium.

2. Prior Art

Highlight is recently focused on optical recording media capable of recording information at a high density and erasing the recorded information for overwriting. One typical overwritable optical recording medium is phase change optical recording medium wherein a laser beam is directed to the recording layer to change its crystalline state whereupon a change in reflectance by the crystallographic change is detected for reading of the information. The phase change optical recording media are of great interest since the medium can be overwritten by modulating the intensity of a single laser beam and the optical system of the drive unit is simple as compared to magnetooptical recording media.

Most optical recording media of the phase change type used Ge—Te systems which provide a substantial difference in reflectance between crystalline and amorphous states and have a relatively stable amorphous state. It was recently proposed to use new compounds known as chalcopyrites.

Chalcopyrite compounds were investigated as compound semiconductor materials and have been applied to solar batteries and the like. The chalcopyrite compounds are composed of Ib-IIIb-VIb$_2$ or IIb-IVb-Vb$_2$ as expressed in terms of the Groups of the Periodic Table and have two stacked diamond structures. The structure of chalcopyrite compounds can be readily determined by X-ray structural analysis and their basic characteristics are described, for example, in Physics, Vol. 8, No. 8 (1987), pp. 441 and Denki Kagaku (Electrochemistry), Vol. 56, No. 4 (1988), pp. 228.

Among the chalcopyrite compounds, AgInTe$_2$ is known to be applicable as a recording material by diluting it with Sb or Bi. The resulting optical recording media are generally operated at a linear velocity of about 7 m/s. See Japanese Patent Application Kokai (JP-A) No. 240590/1991, 99884/1991, 82593/1991, 73384/1991, and 151286/1992.

In addition to these phase change type optical recording media using chalcopyrite compounds, JP-A 267192/1992, 232779/1992, and 166268/1994 disclose phase change type optical recording media wherein a recording layer crystallizes to create an AgSbTe$_2$ phase.

In the case of prior art phase change type optical recording media, recording layers are formed using vacuum deposition equipment and the as-deposited recording layers remain amorphous with low reflectance. The recording layers must be crystallized by an operation generally known as initialization before the recording media can be utilized as rewritable media.

Initialization is carried out in various ways, for example, after a recording layer is formed on a substrate, by heating the substrate to the crystallization temperature of the recording layer for crystallization as disclosed in JP-A 3131/1990; illuminating a laser beam to the recording layer for crystallization, which method is called solid phase initialization, as disclosed in JP-A 366424/1992, 201734/1990 and 76027/1991; illuminating flash light to the substrate to achieve pseudo-crystallization by so-called photo-darkening, which method takes advantage of the photo characteristics of chalcogen compounds, as disclosed in JP-A 281219/1992; and high-frequency induction heating the medium. JP-A98847/1990 proposes to heat a substrate during formation of a recording layer to thereby crystallize the recording layer. JP-A 5246/1990 discloses a method involving the steps of forming a first dielectric layer, forming a recording layer thereon, heating it for crystallization, and forming a second dielectric layer thereon.

However, the initialization step by laser beam illumination takes a long time and is makes the productivity lower. Heating of the overall medium rejects the use of inexpensive resin substrates. That is, resin substrates can be distorted upon heating for initialization, causing errors in tracking. The method of illuminating flash light is also low in productivity because several shots of illumination are necessary to achieve full crystallization.

Under the circumstances, the use of a so-called bulk erasing is the only technique which is regarded commercially acceptable and currently used. The bulk eraser illuminates a beam from a high power gas or semiconductor laser through a relatively large aperture stop for crystallizing a multiplicity of tracks altogether. Since the bulk eraser permits the recording layer to be locally heated, the substrate temperature is elevated to a little extent, enabling the use of less heat resistant resins as substrates.

Initialization of an optical recording disc with a bulk eraser, however, is a time-consuming process, and it takes several minutes just to initialize the optical recording discs of 12 cm diameter. The process of initialization has been the rate-determining step in the production of the optical recording discs. Elimination or speedup of the initialization step is required for improving the production efficiency.

For the speedup of the initialization process, it is effective to decrease the crystallization temperature of the recording layer. When the recording layer has a lower crystallization temperature, the recording layer will be crystallized even if the bulk eraser was operated at a faster rate. Furthermore, if the crystallization temperature of the recording layer could be reduced to the distortion temperature of polycarbonate, polyolefin and other resins commonly used for the substrate of the optical recording medium about 120° C., the initialization can be accomplished simply by heating the medium in an oven and there will be no need to use of the expensive bulk eraser. A significant reduction in the initialization cost by the use of simple initialization process is thereby enabled. At the moment, initialization of the disc in an oven with no distortion in the resin substrate is impossible because the crystallization temperature of the phase change recording materials commonly used in the art, for example, Ag—In—Sb—Te-based materials and Ge—Sb—Te-based materials are in the range of about 170 to about 200° C.

Various processes are proposed for the purpose of reducing the crystallization temperature of the phase change recording layer. For example, JP-A 106647/1996 proposes a Ag—In—Sb—Te-based recording layer of the structure wherein AgSbTe$_2$ layer and In—Sb layer, or AgSbTe$_2$ layer, In layer, and Sb layer are separately disposed. In JP-A 106647/1996, the reduced energy for the initialization due to the adoption of the crystallized AgSbTe$_2$ layer is described as its merit. However, composition of the unit layers is limited in JP-A 106647/1996 since it is an object of the JP-A 106647/1996 to form a recording in the form of an artificial lattice film. As a consequence, formation of a recording layer having overall composition optimal for phase change recording is difficult. In addition, since the unit layers in the recording layer are formed as separate layers, formation of a uniform recording layer is difficult even when the recording layer is initialized by heating, and the medium suffer from insufficiently stable properties. It should be noted that the JP-A 106647/1996 is silent about the specific condition used in the initialization (linear velocity, laser power, etc.).

U.S. Pat. No. 4,889,746 proposes lamination of a single element layer such as Sb layer and a low-melting intermetallic compound layer on a heated substrate. In U.S. Pat. No. 4,889,746, composition of the layers is determined such that average composition of these layers fall within the composition of a recording layer. Also disclosed is the capability of reducing the crystallization temperature of each layer. The medium of U.S. Pat. No. 4,889,746 still suffers from insufficient uniformity of the recording layer due to the formation of the unit layers as separate layers, and therefore, from the insufficiently stable properties.

The assignee of the present invention has made proposals in JP-A 221814/1996 and JP-A 226173/1998 to dispense with or speed up the initialization.

JP-A 221814/1996 proposes formation of an In—Ag—Te—Sb-based layer by separate steps of (Sb+In) sputtering step and (Ag+Te) sputtering step, or by separate steps of Sb sputtering step, In sputtering step, and (Ag+Te) sputtering step. The recording layer formed by such process is crystallized at least in a part. The recording layer formed by such process exhibits a reflectance equivalent to the one measured after the initialization with a bulk eraser if the medium is repeatedly overwritten and the elements in the recording layer has sufficiently diffused to become mixed with other elements. However, the recording layer formed by such process exhibits unstable degree of erasure as in the case of prior art phase change medium in the overwriting operations from the as-deposited state to several overwriting operations. To be more specific, the reflectance does not become stable until the entire surface is covered by the overwritten region because the reflectance of the region that has been crystallized in the formation of the recording layer is different from the region crystallized in the course of the overwriting operations. In the case of mark edge recording as adopted in rewritable digital video disc (DVD-RAM) and the like, such variation in the reflectance invites erroneous recognition of the mark edge.

JP-A 226173/1998 proposes formation of a recording layer by depositing an Sb-based thin film containing Sb as its main component and a reactive thin film containing In, Ag, and Te, or In, Ag, Te, and Sb as its main components followed by a heat treatment (referred in JP-A 226173/1998 as the "mixing treatment") for the purpose of mixing these layers. This heat treatment corresponds to the initialization in conventional phase change recording medium in the sense that the as-deposited recording layer is converted to the ready-to-be written state. In the Examples of JP-A 226173/1998, the medium exhibits stable degree of eraser from the first overwriting operation. It has been, however, found in the further investigation that such medium suffers from inconsistent jitter in the first several overwriting operations.

In addition to the publications as described above, JP-A 79144/1998 proposes promotion of crystallization by varying the current density in the course of the recording layer formation by sputtering. The current density used in this proposal, however, is considerably high, and such current density can not be used in the mass production in view of the risk of target destruction.

JP-A 62259/1993 proposes optical heating in the course of the recording layer formation. In this process, however, provision of a high-intensity halogen lamp in the vacuum chamber is required, and crystallization of the recording layer with no resin substrate deformation is impossible.

SUMMARY OF THE INVENTION

In view of the situation as described above, an object of the present invention is to reduce the production cost by reducing the time required for the initialization and simplifying the initialization process in the phase change optical recording medium wherein initialization process of the recording layer has been the rate determining and cost-increasing factor in the production of the medium. Another object of the invention is to realize stable writing/reading properties from immediately after the initialization.

Such objects are attained by the present invention as described in (1) to (14), below.

(1) An optical recording medium comprising a substrate and a recording layer formed over the substrate, wherein the recording layer comprises two or more unit recording layers wherein adjacent two unit recording layers are constituted from different materials and mixture layers between the two adjacent unit recording layers containing all of the elements included in the adjacent two unit recording layers;

at least one of the two adjacent unit recording layers is a crystalline layer; and the overall composition of the recording layer falls within the composition of a phase change recording material.

(2) An optical recording medium according to the above (1) wherein at least one type of the unit recording layers is formed as a crystalline layer and the mixture layer adjacent to the crystalline unit recording layer is formed as an amorphous layer.

(3) An optical recording medium according to the-above (1) wherein the recording layer after crystallization by heating has an average crystal grain size of 3 to 18 nm in the non-recorded region.

(4) An optical recording medium according to the above (1) wherein said recording layer contains Ag, In, Sb, and Te as the main components.

(5) An optical recording medium according to the above (1) wherein said recording layer contains Ge, Sb, and Te as the main components.

(6) A method for producing an optical recording medium comprising a substrate and a recording layer formed over the substrate by sputtering two or more types of targets, wherein when two of said targets are designated a first target and a second target, a step is provided wherein the first target and the second target are simultaneously sputtered between the step of sputtering the first target alone and the step of sputtering the second target alone, and composition of the targets and power supplied are controlled such that the overall composition of the recording layer formed falls within the composition of a phase change recording material.

(7) A method for producing an optical recording medium according to the above (6) wherein the recording layer is subjected to an initialization wherein the recording layer formed is heated for crystallization.

(8) A method for producing an optical recording medium according to the above (6) by which the optical recording medium of the above (1) is produced.

(9) A method for producing an optical recording medium comprising a substrate and a recording layer formed over the substrate by sputtering two or more types of targets, wherein when three of said targets are designated a first target, a second target, and a third target, the second target contains all of the elements included in the first and the third targets, and the recording layer is formed by the steps wherein the first target, the second target, and the third target are respectively sputtered in this order, and composition of the targets and power supplied are controlled such that the overall composition of the recording layer formed falls within the composition of a phase change recording material.

(10) A method for producing an optical recording medium according to the above (9) wherein the recording layer is subjected to an initialization wherein the recording layer formed is heated for crystallization.

(11) A method for producing an optical recording medium according to the above (9) by which the optical recording medium of the above (1) is produced.

(12) A method for producing an optical recording medium comprising a substrate and a recording layer formed over the substrate by sputtering two or more types of targets, wherein the recording layer is formed by a step wherein said substrate is moved such that the substrate is sequentially opposed to said targets while the targets are simultaneously sputtered, and composition of the targets and power supplied are controlled such that the overall composition of the recording layer formed falls within the composition of a phase change recording material.

(13) A method for producing an optical recording medium according to the above (12) wherein the recording layer is subjected to an initialization wherein the recording layer formed is heated for crystallization.

(14) A method for producing an optical recording medium according to the above (12) by which the optical recording medium of the above (1) is produced.

DETAILED DESCRIPTION OF THE INVENTION

Figure 1:
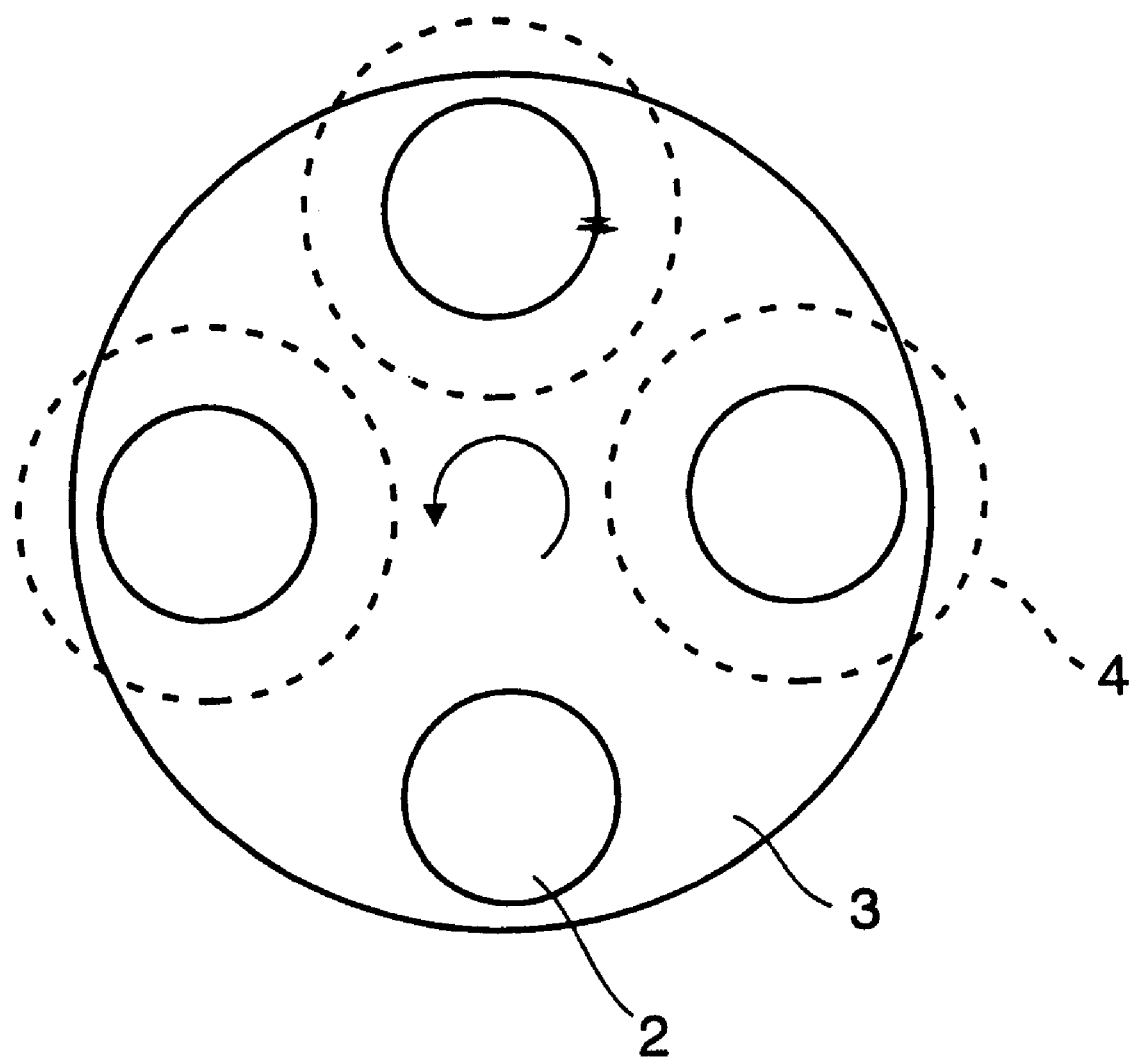
FIG. 1 is a plan view showing the major section of the sputtering system used in the Examples of the invention.

In the prior art phase change optical recording media of the type common in the art, the as-deposited amorphous mono-layer recording layer formed by sputtering is initialized (crystallized) by heating followed by slow cooling. When the initialized recording layer is irradiated with an overwriting light beam, the area irradiated with the light beam of write power melts and then rapidly cools to thereby form a record mark in amorphous or microcrystalline state where reflectance is reduced. On the other hand, the area irradiated with the light beam of erase power undergoes no change, and the reflectance of the level after the initialization is retained. In the subsequent overwriting operations, the area where the record mark is to be formed is irradiated with the light beam of write power while other areas are irradiated with the beam of erase power. The area irradiated with the light beam of write power always becomes amorphous or microcrystalline and the area irradiated with the light beam of erase power always becomes crystalline irrespective of the state of the area before the irradiation whether the area had been crystalline or amorphous/microcrystalline, and the overwriting is thereby enabled.

As opposed to these prior art optical recording medium, the recording layer in the optical recording medium of the present invention comprises two or more unit recording layers and mixture layers between two adjacent unit recording layers containing all of the elements included in the adjacent two unit recording layers. The overall composition of the recording layer, namely, the composition of the sum of the unit recording layers and the mixture layers falls within the composition of a phase change recording material. In the present invention, the unit recording layer contains at least one of the group of elements constituting the phase change recording materials. The adjacent two unit recording layers are always different in their compositions. The mixture layer between two adjacent unit recording layers has a composition constituted from the elements included in the adjacent two unit recording layers. As described above, the unit recording layer may contain all elements of the group of elements constituting the phase change recording material as long as the two adjacent unit recording layers are different in their compositions from each other. However, the unit recording layer is preferably of the composition lacking at least one of the group of elements constituting the phase change recording material to realize a moderate compositional transition between the unit recording layer and the adjacent mixture layer.

At least one of the unit recording layers is formed as a crystalline layer, and the mixture layer adjacent to such crystalline unit recording layer is formed as an amorphous layer. Other unit recording layers and other mixture layers may be formed either in crystalline or amorphous state. The unit recording layer formed as a crystalline layer may comprise an element which is easily formed in crystalline state when the layer is deposited by sputtering, for example, Sb or Te as a simple substance. When the mixture layer is formed by sputtering, the mixture layer is usually formed as an amorphous layer.

In the recording layers of the present invention, crystalline layer (at least one of the unit recording layers) and amorphous layer (mixture layer) are present in contact with each other, and numerous distortion is generated at the boundary between such layers to function as the crystal nucleus. Significant reduction in the crystallization temperature of the recording layer during the subsequent initialization process is thereby realized to enable great reduction in the time required for the crystallization. Provision of three layers having transitional compositions, namely, two unit recording layers and a mixture layer sandwiched therebetween facilitates crystallization of the recording layer to enable uniform crystallization of the recording layer in the initialization process. Stable writing/reading properties from immediately after the initialization is thereby realized. Since uniform crystallization of the recording layer is facilitated, change in quality of the recording layer is suppressed during the long-range storage after the initialization, and reliability is thereby improved.

In the optical recording medium of the present invention, the medium after the initialization can be used in completely the same way as the prior art phase change optical recording medium. To be more specific, the medium is subjected to the writing and the overwriting in the same way as the prior art phase change optical recording medium, and the area of the recording layer irradiated with the light beam of record power melts and then rapidly cools to become amorphous or microcrystalline, and the record mark is thereby formed.

In the optical recording medium of the present invention, crystal grain size of the recording layer after the initialization is smaller than that of the conventional optical medium due to the abundance of the crystal growth nucleus. Even if the recording layer were of laminate type, the crystallization temperature is not reduced when too many unit layers are deposited since the proportion of the amorphous mixture layer is simultaneously increased to the extent that the crystalline area is scarcely left and the amount of the crystal growth nucleus will be reduced. Because the crystallization temperature is not reduced in such a case, the crystallization temperature remains similar to that of the conventional recording layer of non-laminate type, and crystal grain size after the initialization is not reduced. In the optical recording medium of the present invention, average crystal grain size of the as-initialized recording layer before the overwriting operation in the range of 3 to 18 nm in the non-recorded region indicates abundance of the crystal growth nucleus in the recording layer before the initialization and sufficiently low temperature during the initialization. In addition, the properties of the optical recording medium of the present invention are stable from immediately after the initialization due to the uniformity of the initialized recording layer. For example, the jitter after 1,000 overwriting operations is at most 1.5 times that of the jitter in the recording immediately after the initialization. Therefore, adoption of the present invention is identifiable even if the laminate structure of the recording layer has become ambiguous in the course of the initialization. It should be noted that the term "average crystal grain size" of the recording layer as used herein is the average crystal grain size of the recording layer in the lateral direction of the recording layer, and the average crystal grain size is determined from the full width at half maximum of sb(014) peak when the sample is analyzed by X-ray diffractometry at a low incident angle (0.5°).

JP-A 94134/1997 describes a technique wherein microcrystals are dispersed in the recording layer to play the role of crystal nucleus. This technique, however, is involved with production difficulty since the microcrystals are dispersed in the recording layer to substantial uniformity by the use of a powder target, whose handling is generally difficult. As opposed to such technique, the target used in the present invention is not limited to any particular type, and precipitation of the microcrystals is promoted by the use of compositional difference in the thickness direction of the recording layer.

JP-A 345478/1993 describes production of an optical information recording medium wherein high erasure ratio and high sensitivity are realized by inclusion of microcrystalline $AgSbTe_2$ in the recording layer. In this medium, however, the microcrystals are precipitated in the uniform recording layer in the course of the initialization, and the initialization temperature can not be reduced as opposed to the present invention wherein the crystal nucleus is formed before the initialization.

Next, the present invention is described in further detail. It should be noted that a phase change optical recording medium having a recording layer contains Ag, In, Sb and Te as its main components or Ge, Sb and Te as its main components is described in the following description since the present invention is preferably applied to the medium having such a recording layer.

Optical Recording Medium

At least one of the unit recording layers contains an element which is readily crystallized in the formation of the layer by sputtering. To be more specific, at least one of the unit recording layers preferably contains Sb or Te as its main component at a content of 95 at % or higher, and in particular, 97 to 100 at %. The unit recording layer formed in crystalline state may preferably have a thickness of at least 2 nm, and more preferably, at least 4 nm. Formation of the unit recording layer in crystalline state will be difficult when the Sb content or the Te content in the unit recording layer is too low or when the unit recording layer is too thin.

Of the elements constituting the phase change recording material, Ag and In can also be deposited in crystallization by sputtering. Ag and In, however, only constitute a small proportion of the recording layer. As a consequence, the Ag layer and the In layer are generally thin, and the thin Ag layer and In layer formed are often amorphous. Therefore, Sb or Te is preferably used for the unit recording layer which should be formed as a crystalline layer.

In the present invention, at least one of the unit recording layers is the unit recording layer formed as a crystalline layer. However, it is also acceptable that all of the unit recording layers are those formed as a crystalline layer. The composition and the thickness of the unit recording layer which is formed as an amorphous layer may be designed such that the overall recording layer fall within the composition of a phase change recording material. The thickness of such layer, however, is generally at least 0.5 nm, and preferably, at least 1 nm.

When the unit recording layer is too thick, uniformity of the recording layer after the initialization is likely to be insufficient. In addition, overall recording layer will be too thick to detract from light transparency, leading to insufficient reflectance and insufficient degree of modulation. In view of such situation, the unit recording layer is deposited preferably to a thickness of up to 15 nm, and more preferably, to a thickness of up to 11 nm.

The mixture layer is a layer which contains all of the elements included in the adjacent two unit recording layers. The thickness of the mixture layer may be adequately determined such that the layer is easily crystallized and formation of the uniform recording layer is facilitated in the initialization. The thickness of the mixture is preferably in the range of 0.5 to 10 nm, and more preferably from 1 to 8 nm when the unit recording layer is deposited to the thickness as described above.

It should be noted that, in the present invention, the thickness of the unit recording layer and the mixture layer is calculated and expressed in terms of the product of the film deposition rate and the film deposition duration.

In the present invention, the unit recording layer and the mixture layer does not necessary define a clear boundary. In other words, the present invention also encompasses an optical recording medium wherein the composition of the recording layer continuously alters in vertical direction, and wherein crystalline region corresponding to the unit recording layer and amorphous region corresponding to the mixture layer, and amorphous or crystalline region corresponding other unit recording layer are alternately present in the vertical direction. Such recording layer is formed, for example, by the third method as described below. It should be noted that, in such recording layer, the thickness of the recording layer divided by the total number of the unit recording layers and the mixture layers, namely, the average layer thickness is preferably at least 0.5 nm, and more preferably, at least 1 nm.

Although the recording layer may comprise two unit recording layers and the mixture layer between such unit recording layers, the energy required for the initialization can be reduced if three or more unit recording layers are deposited. When three or more unit recording layers are present in the recording layer, the unit recording layers may comprise the two types of unit recording layers, or three or more types of unit recording layers. For example, both of the layer containing Sb as its main component and the layer containing Te as its main component may be provided as the unit recording layers which are to be formed in crystalline state. It should be noted that all of the unit recording layers may have an identical thickness while the thickness of the unit recording layers may differ in some or all of the unit recording layers.

Typical combinations of the unit recording layers are shown in Table 1, below. The combinations, however, are not limited to those shown below.

TABLE 1

| Overall composition of | Unit recording layer | |
|---|---|---|
| the recording layer | Crystalline layer | Amorphous layer |
| Ag-In-Sb-Te | Sb | Ag-In-Te |
| Ag-In-Sb-Te | Te | Ag-In-Sb |
| Ag-In-Sb-Te | Sb Te | Ag-In |
| Ag-In-Sb-Te | Ag In Sb Te | |
| Ge-Sb-Te | Sb | Ge-Te |
| Ge-Sb-Te | Te | Ge-Sb |
| Ge-Sb-Te | Sb Te | Ge |

Next, overall composition of the recording layer is described.

When the recording layer contains Ag, In, Sb and Te as its main components, the overall composition (in atomic ratio) of the recording layer is preferably such that:

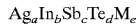

$$Ag_a In_b Sb_c Te_d M_e \quad (I)$$

wherein $0.03 \leq a \leq 0.15$, $0.02 \leq b \leq 0.1$, $0.5 \leq c \leq 0.75$, $0.2 \leq d \leq 0.4$, $0 \leq e \leq 0.1$, and $a+b+c+d+e = 1$ The element M in formula (I) may be any element other than Ag, In, Sb, and Te, and preferably, M is an element selected from Ge, Sn, Pb, H, Si, C, V, W, Ta, Zn, Ti, Ce, Tb, and Y.

When the recording layer contains Ge, Sb, and Te as its main components, the overall composition (in atomic ratio) of the recording layer is preferably such that:

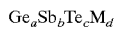

$$Ge_a Sb_b Te_c M_d \quad (II)$$

wherein $0.1 \leq a \leq 0.25$, $0.15 \leq b \leq 0.3$, $0.35 \leq c \leq 0.6$, $0 \leq d \leq 0.1$, and $a+b+c+d = 1$ The element M in formula (II) may be any element other than Ge, Sb, and Te, and preferably, M is an element selected from Ag, Pd, Cu, Au, Ni, and Pt.

The recording layer is preferably formed to a thickness of 9.5 to 50 nm, and more preferably, to a thickness of 13 to 30 nm. When the recording layer is too thin, growth of the crystalline phase will be difficult and the reflectance difference created by the phase change will be insufficient. When the recording layer is too thick, the reflectance and the degree of modulation will be reduced as described above.

In the optical recording medium of the present invention, a lower dielectric layer is generally formed between the recording layer and the substrate, and an upper dielectric layer is formed on the recording layer. Although the writing/reading beam is generally directed from the side of the lower dielectric layer through the substrate, the writing/reading beam may be irradiated from the side of the upper dielectric layer without passing through the substrate for the purpose of high-density recording. In addition, the medium may be constituted to allow passage of the writing/reading beam through the medium although the medium is generally of the constitution such that the writing/reading beam entering in the medium is reflected to exit from the plane of incidence. Also encompassed are the constitution wherein the writing beam and reading beam are respectively directed from different sides of the medium, and the constitution wherein a reflective layer is provided on the upper dielectric layer, or between the substrate and the lower dielectric layer as desired.

Formation of the Recording Layer

The method employed in the actual formation of the recording layer having the structure wherein adjacent two unit recording layers sandwich the mixture layer is not limited to any particular process. The recording layer, however, is preferably formed by any one of the first method, the second method, and the third method as described below.

In these methods, the recording layer may be formed over the substrate by sputtering the targets of two or more types. In the sputtering, the composition of each target and the power supplied are adjusted so that the composition of the overall recording layer including all of the unit recording layers and the mixture layer(s) falls within the composition of a phase change recording material.

In the first method, when two of said two or more types of targets are designated a first target and a second target, a step is provided wherein the first target and the second target are simultaneously sputtered between the step of sputtering the first target alone and the step of sputtering the second target alone. In this method, the layer formed during the independent sputtering of the first or the second target corresponds to the unit recording layers as described above, and the layer formed during the simultaneous sputtering of the first and second targets corresponds to the mixture layer as described above.

In the second method, when three of said targets are designated a first target, a second target, and a third target, the second target contains the elements of the first and the third targets, and the recording layer is formed by the steps wherein the first target, the second target, and the third target are respectively sputtered in this order. In this method, the layer formed during the independent sputtering of the first or the third target corresponds to the unit recording layers as described above, and the layer formed during the independent sputtering of the second target corresponds to the mixture layer as described above.

In the third method, the recording layer is formed by a step wherein said substrate is moved such that the substrate is sequentially opposed to said targets while the targets are simultaneously sputtered. In this method, the layers formed when the substrate is in opposed relationship with each target correspond to the unit recording layers as described above, and the layer formed when the substrate is located at a position below and between two adjacent targets corresponds to the mixture layer as described above.

After the formation of the recording layer, the medium is subjected to initialization wherein the overall recording layer is heated. The initialization may be conducted at a temperature which allows mixing of the unit recording layers and the mixture layer as well as the crystallization of the overall recording layer. In the present invention, the mixing and the crystallization can be generally accomplished at a temperature as low as up to 160° C. As a consequence, initialization speed can be increased in the initialization using a bulk eraser. The present invention has also enabled to adjust the composition of the unit recording layers so that the medium can be initialized at a temperature as low as up to 120° C., and in such a case, the medium having a resin substrate of polycarbonate, an olefin, or other like can be initialized at a temperature below its heat distortion temperature. In other words, the substrate and the recording layer formed thereon can be initialized as a whole by heating the medium in an oven or the like, and the simplification and cost reduction of the initialization is thereby enabled.

EXAMPLE

Examples of the present invention are given below by way of illustration and not by way of limitation.

Example 1-1

An optical recording disc was prepared by injection molding polycarbonate into a disc shaped substrate having a diameter of 120 mm and a thickness of 0.6 mm. A groove was formed in one major surface of the substrate simultaneous with injection molding. On the grooved surface of the substrate, there were formed a lower dielectric layer, a recording layer, an upper dielectric layer, a reflective layer, and a protective layer. Another substrate which is the same as the one as described above was further adhered to the protective layer to produce the optical recording disc sample.

The lower dielectric layer was formed by sputtering a target of ZnS and $SiO_2$. The value of $SiO_2/(ZnS+SiO_2)$ was 20 mol %. The lower dielectric layer had a thickness of 85 nm.

The recording layer was formed by the third procedure of the procedures as described above. FIG. 1 is a plan view schematically showing the sputtering system used. This system has a disc-shaped carousel 3 which is capable of holding four discs 2. The carousel 3 rotates around its central axis, and the disc 2 passes immediately below each target 4 as the carousel 3 rotates around its own axis.

Three types of targets, namely, the targets comprising Sb, Te, and Ag (60 at %)—In (40 at %) alloy, respectively, were used as the targets for forming the unit recording layers. All targets were simultaneously sputtered by controlling the power supplied to each target so that the overall composition of the recording layer was $Ag_6In_4Sb_{60}Te_{30}$. In the sputtering, the rotation speed of the carousel was set at 10 rpm and the sputtering was conducted for a sputtering period of 30 seconds so that each disc passes immediately below each target for 5 times. In this procedure, the disc passed immediately below each target one after another in correspondence with the rotation of the carousel, and when the disc was located at a position immediately below a particular target, a film was formed to a composition substantially the same as the composition of the particular target and the unit recording layer was thereby formed. When the disc was moving below and between two adjacent targets, the film formed was the mixture layer. As a consequence, the mixture layer was formed to be sandwiched between two unit recording layers. The recording layer was deposited to a total thickness of 23 nm.

The upper dielectric layer was formed by sputtering a target of ZnS and $SiO_2$. The value of $SiO_2/(ZnS+SiO_2)$ was 50 mol %. The lower dielectric layer had a thickness of 20 nm.

The reflective layer was formed by sputtering an Al—Cr alloy target in argon atmosphere to a thickness of 100 nm. The protective layer was formed by applying a UV curable resin by spin coating and exposing it to UV for curing.

Next, the sample was initialized with a bulk eraser at a power of 700 mW and a head feed speed of 60 $\mu$m/round. In the initialization, linear velocity of the bulk eraser was altered, and the time required for completing the initialization was measured after increasing the linear velocity to the critical level for accomplishing the initialization. The results are shown in Table 2. Completion of the initialization was confirmed by measuring the reflectance.

The sample was also measured for the crystallization temperature of the recording layer. The results are shown in Table 2. This measurement was conducted by using a slide glass which had been provided with the recording layer by placing the slide glass in the sputtering system simultaneously with the recording layer formation of the sample disc, and by monitoring the reflectance while elevating the temperature of the slide glass at a rate of 10° C./min.

The sample after the initialization of the recording layer was also evaluated for average crystal grain size in the lateral direction of the recording layer from the full width at half maximum of Sb(014) peak when the sample was analyzed by X-ray diffractometry at a low incident angle (0.5°). The results are shown in Table 2.

The sample after the initialization of the recording layer was also evaluated for clock jitter after recording for the first time; after two overwriting operations; and after 1000 overwriting operations, respectively. The results are shown in Table 2 as "initial", "two operations" and "1000 operations". It should be noted that the signals were recorded under the conditions:

linear velocity: 3.5 m/s, clock frequency: 26.16 MHz, laser wavelength: 635 nm, numerical aperture (NA): 0.6, recording signal: 8–16 modulation, minimum record mark length: 0.40 $\mu$m, recording power: 14.0 mW, erasing power: 6.5 mW, and bias power: 0.5 mW.

The clock jitter was evaluated after the recording by measuring the readout signals with a time interval analyzer and calculating:

$$\sigma/T\ (\%)$$

wherein T stands for window width.

Examples 1-2

The procedure of Example 1-1 was repeated except that the rotation speed of the carousel in the formation of the recording layer was set at 6 rpm so that the each disc passes below each target for 3 times. The thus produced sample was evaluated as in the case of Example 1-1. The results are shown in Table 2.

Examples 1-3

The procedure of Example 1-1 was repeated except that the rotation speed of the carousel in the formation of the recording layer was set at 4 rpm so that the each disc passes below each target twice. The thus produced sample was evaluated as in the case of Example 1-1. The results are shown in Table 2.

Examples 1-4

The procedure of Example 1-1 was repeated except that the rotation speed of the carousel in the formation of the recording layer was set at 2 rpm so that the each disc passes below each target once. The thus produced sample was evaluated as in the case of Example 1-1. The results are shown in Table 2.

Examples 1-5

The recording layer was formed by the first procedure of the procedures as described above. The sputtering system and the targets used were the same as those used in Example 1-1. The rotation speed of the carousel was set at 40 rpm, and the targets were sputtered in the sequence of Te→Sb→Ag—In alloy for 15 seconds/target. This procedure was repeated twice. In the sputtering of each target, sputtering of the next target was started 5 seconds before finishing the sputtering of the particular target. In other words, the uppermost and the lowermost unit recording layers were formed in 10 seconds, the mixture layers were formed in 5 seconds, and the unit recording layers sandwiched between the mixture layers were formed in 5 seconds. The parts of the recording layer formed by co-sputtering of the two targets was not in the form of a laminate due to the high rotation speed of the carousel, and these parts constituted the mixture layer wherein the elements constituting the two targets were deposited in the form of a mixture.

Other conditions were the same as those of Example 1-1, and the thus produced sample was evaluated as in the case of Example 1-1. The results are shown in Table 2.

Examples 1-6

The recording layer was formed by the first procedure of the procedures as described above. The sputtering system and the targets used were the same as those used in Example 1-1. The rotation speed of the carousel was set at 40 rpm, and the targets were sputtered in the sequence of Te→Sb→Ag—In alloy for 30 seconds/target. In the sputtering of each target, sputtering of the next target was started 10 seconds before finishing the sputtering of the particular target. In other words, the uppermost and the lowermost unit recording layers were formed in 20 seconds, the mixture layers were formed in 10 seconds, and the unit recording layers sandwiched between the mixture layers were formed in 10 seconds. The parts of the recording layer formed by co-sputtering of the two targets was not in the form of a laminate due to the high rotation speed of the carousel, and these parts constituted the mixture layer wherein the elements constituting the two targets were deposited in the form of a mixture.

Other conditions were the same as those of Example 1-1, and the thus produced sample was evaluated as in the case of Example 1-1. The results are shown in Table 2.

Examples 1-7

The recording layer was formed by the third procedure of the procedures as described above. The sputtering system used was the one equipped with a plurality of chambers, and wherein, in each chamber, a disc-shaped target and the disc can be placed in opposed relation to each other at an interval of 5 cm. In the formation of the recording layer, however, only one of the chambers was used, and the chamber was loaded with a circular disc-shaped target which was constituted from three sectors each comprising Sb, Te and Ag (60 at %)—In (40 at %) alloy. The area of the Sb, the Te and the Ag—In alloy sectors was adjusted by taking the sputtering rate into consideration so that the overall composition or the resulting recording layer was the same as that of Example 1-1. The target was sputtered while the disc was rotated at a rate of 3 rpm. In this procedure, three types of unit recording layers and mixture layers between the unit recording layers were formed by a mechanism similar to Example 1-1.

Other conditions were the same as those of Example 1-1, and the thus produced sample was evaluated as in the case of Example 1-1. The results are shown in Table 2.

Examples 1-8

The recording layer was formed by the second procedure of the procedures as described above. The sputtering system used was the same as the one used in Example 1-7, and in this Example, five of the chambers in the sputtering system was used for the recording layer formation. Each chamber used was loaded either with the target for the unit recording layer formation or the target for the mixture layer formation, and the targets loaded in the respective chambers were sequentially sputtered to form a recording layer of five-layer structure. To be more specific, the recording layer was constituted from Ag—In (unit recording layer; thickness, 1.15 nm), Ag—In—Sb (mixture layer; thickness, 2.3 nm), Sb (unit recording layer; thickness, 11.5 nm), Sb—Te (mixture layer; thickness, 2.3 nm), Te (unit recording layer; thickness, 5.75 nm) layers from the side of the substrate. The total thickness of the recording layer was the same as that of other Examples.

Other conditions were the same as those of Example 1-1, and the thus produced sample was evaluated as in the case of Example 1-1. The results are shown in Table 2.

Comparative Example 1-1

The procedure of Example 1-1 was repeated except that the rotation speed of the carousel in the formation of the recording layer was set at 30 rpm so that the each disc passes below each target for 15 times. The thus produced sample was evaluated as in the case of Example 1-1. The results are shown in Table 2. It should be noted that, in this Comparative Example, the thickness of the thickest unit recording layer (Sb layer) was 0.9 nm, and the Sb layer and the Te layer of this sample did not become crystalline.

Comparative Example 1-2

The procedure of Example 1-1 was repeated except that the rotation speed of the carousel in the formation of the recording layer was set at 20 rpm so that the each disc passes below each target for 10 times. The thus produced sample was evaluated as in the case of Example 1-1. The results are shown in Table 2. It should be noted that, in this Comparative Example, the thickness of the thickest unit recording layer (Sb layer) was 1.4 nm, and the Sb layer and the Te layer of this sample did not become crystalline.

Comparative Example 1-3

The recording layer was formed by sputtering with a sputtering system the same as the one used in Example 1-1, while the target was an alloy target of the composition the same as the entire composition of the recording layer in Example 1-1 which was used alone. The carousel was rotated at a rate of 30 rpm so that the target passed immediately below each target for 15 times.

Other conditions were the same as those of Example 1-1, and the thus produced sample was evaluated as in the case of Example 1-1. The results are shown in Table 2.

Comparative Example 1-4

A sample was produced by repeating the procedure of Example 1-6 except that the co-sputtering of the two targets was not conducted. This sample was recorded with the as-deposited recording layer with no initialization procedure, and the clock jitter was evaluated. The results are shown in Table 2.

Example 2-1

A sample was produced by repeating the procedure of Example 1-1 except that the three targets each comprising Sb, Te and Ge—Te alloy were used, the power was adjusted so that the overall composition of the recording layer was $Ge_1Sb_2Te_4$, and the carousel was rotated at 4 rpm so that the disc passed immediately below each target twice. Other conditions were the same as those of Example 1-1, and the thus produced sample was evaluated as in the case of Example 1-1. The results are shown in Table 2.

Comparative Example 2-1

The procedure of Example 2-1 was repeated except that the rotation speed of the carousel in the formation of the recording layer was set at 30 rpm so that the each disc passes below each target for 15 times. The thus produced sample was evaluated as in the case of Example 1-1. The results are shown in Table 2. It should be noted that, in this Comparative Example, the thickness of the thickest unit recording layer (Te layer) was 0.7 nm, and the Sb layer and the Te layer of this sample did not become crystalline.

Comparative Example 2-2

The recording layer was formed by sputtering with a sputtering system the same as the one used in Example 2-1, while the target was an alloy target of the composition the same as the entire composition of the recording layer in Example 2-1 which was used alone. The carousel was rotated at a rate of 30 rpm so that the target passed immediately below each target for 15 times.

Other conditions were the same as those of Example 2-1, and the thus produced sample was evaluated as in the case of Example 1-1. The results are shown in Table 2.

As demonstrated in Table 2, the crystallization temperature of the recording layer is remarkably reduced in the present invention. This in turn means that, when the medium is initialized by a bulk eraser, the linear velocity can be increased with no increase in the power. Speedup of the initialization is thereby enabled.

It should be noted that the crystallization temperature of the one shown in Table 2 is the measurements obtained by increasing the disc temperature at a constant rate. Experiments were also conducted for the case wherein the disc was maintained at a constant temperature. It was then confirmed for the Examples 1-3, 1-4, 1-5, 1-6, 1-7, 1-8, and 2-1 that the entire recording layer can be crystallized with no damage in the polycarbonate substrate when the disc is retained at a constant temperature of 110° C., and the use of the expensive eraser is no longer necessary.

It was also revealed that the decrease in the crystallization temperature does not substantially occur in the samples having an average crystal grain size in excess of 18 nm.

The results in Table 2 also reveal that the samples of the Examples exhibit low clock jitter from immediately after the initialization and undergo no substantial fluctuation in the clock jitter in the repeated overwriting operations. In contrast, in the case of Comparative Example 1-4 wherein no mixture layer is deposited, a significantly high clock jitter is already measured after two overwriting operations.

It should be noted that the samples of the Examples as described above were also confirmed for their reliability by storing the initialized discs under the conditions of 80° C. and 80% RH for 100 hours. No increase in the clock jitter was found.

The benefits of the invention are evident from the results of these samples.

Japanese Patent Application No. 40270/1999 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

TABLE 2

|  | Clock jitter (%) | | | Crystallization temperature (° C.) | Initialization duration (sec.) | Average crystal grain size (nm) |
| --- | --- | --- | --- | --- | --- | --- |
|  | Initial | 2 operations | 1000 operations | | | |
| Example 1-1 | 7.5 | 9.5 | 9.4 | 153 | 48 | 17 |
| Example 1-2 | 7.7 | 9.4 | 9.6 | 130 | 42 | 12 |
| Example 1-3 | 8.0 | 9.6 | 9.8 | 116 | 36 | 11 |
| Example 1-4 | 8.0 | 9.9 | 9.9 | 70 | 30 | 7 |
| Example 1-5 | 7.6 | 9.7 | 9.3 | 123 | 42 | 10 |
| Example 1-6 | 7.6 | 9.6 | 9.5 | 70 | 30 | 5 |
| Example 1-7 | 7.8 | 9.2 | 9.4 | 112 | 36 | 10 |
| Example 1-8 | 8.0 | 9.7 | 9.7 | 95 | 30 | 9 |
| Comparative Example 1-1 | 7.5 | 9.0 | 9.3 | 169 | 60 | 24* |
| Comparative Example 1-2 | 7.6 | 9.1 | 9.4 | 168 | 60 | 23* |
| Comparative Example 1-3 | 7.4 | 9.1 | 9.2 | 169 | 60 | 26* |
| Comparative Example 1-4 | 8.2 | 25 | 10.5 | — | — | 10 |
| Example 2-1 | 8.1 | 9.8 | 9.4 | 123 | 42 | 14 |
| Comparative Example 2-1 | 8.2 | 9.4 | 9.3 | 165 | 54 | 24* |
| Comparative Example 2-2 | 7.8 | 9.3 | 9.4 | 163 | 54 | 23* |

*Outside the scope of the invention.

What is claimed is:

1. An optical recording medium comprising a substrate and a recording layer formed over the substrate, wherein the recording layer comprises two or more unit recording layers wherein adjacent two unit recording layers are constituted from different materials and mixture layers between the two adjacent unit recording layers containing all of the elements included in the adjacent two unit recording layers, said mixture layers having a thickness of 0.5 to 10 mm.

2. An optical recording medium according to claim 1 wherein at least one type of the unit recording layers is formed as a crystalline layer and the mixture layer adjacent to the crystalline unit recording layer is formed as an amorphous layer.

3. An optical recording medium according to claim 1 wherein the recording layer after crystallization by heating has an average crystal grain size of 3 to 18 nm in the non-recorded region.

4. An optical recording medium according to claim 1 wherein said recording layer contains Ag, In, Sb, and Te as the main components.

5. An optical recording medium according to claim 1 wherein said recording layer contains Ge, Sb, and Te as the main components.

6. An optical recording medium according to claim 1, wherein said mixture layer has a thickness of 1 to 8 nm.

7. A method for producing an optical recording medium according to claim 1, comprising a substrate and a recording layer formed over the substrate by sputtering two or more types of targets, wherein when three of said targets are designated a first target, a second target, and a third target, the second target contains all of the elements included in the first and third targets, and the recording layer is formed by the steps wherein the first target, the second target, and the third target are respectively sputtered in this order, and composition of the targets and power supplied are controlled such that the overall composition of the recording layer formed falls within the composition of a phase change recording material.

8. A method for producing an optical recording medium according to claim 7 wherein the recording layer is subjected to an initialization wherein the recording layer formed is heated for crystallization.

9. A method for producing an optical recording medium according to claim 1, comprising a substrate and a recording layer formed over the substrate by sputtering two or more types of targets, wherein the recording layer is formed by a step wherein said substrate is moved such that the substrate is sequentially opposed to said targets while the targets are simultaneously sputtered, and composition of the targets and power supplied are controlled such that the overall composition of the recording layer formed falls within the composition of a phase change recording material.

10. A method for producing an optical recording medium according to claim 9 wherein the recording layer is subjected to an initialization wherein the recording layer formed is heated for crystallization.

11. A method for producing an optical recording medium comprising a substrate and a recording layer formed over the substrate by sputtering two or more types of targets, wherein when two of said targets are designated a first target and a second target, a step is provided wherein the first target and the second target are simultaneously sputtered between the step of sputtering the first target alone and the step of sputtering the second target alone, and composition of the targets and power supplied are controlled such that the overall composition of the recording layer formed falls within the composition of a phase change recording material.

12. A method for producing an optical recording medium according to claim 11 wherein the recording layer is subjected to an initialization wherein the recording layer formed is heated for crystallization.

13. A method for producing an optical recording medium according to claim 11 by which the optical recording medium of claim 1 is produced.

* * * * *

UNITED STATES PATENT AND TRADEMARK OFFICE
CERTIFICATE OF CORRECTION

PATENT NO. : 6,399,173 B1
DATED : June 4, 2002
INVENTOR(S) : Mori Nagayama et al.

It is certified that error appears in the above-identified patent and that said Letters Patent is hereby corrected as shown below:

<u>Column 17,</u>
Line 10, "10 mm." should read -- 10 nm. --

Signed and Sealed this

Twentieth Day of August, 2002

Attest:

Attesting Officer

JAMES E. ROGAN
Director of the United States Patent and Trademark Office